United States Patent Office 3,257,360
Patented June 21, 1966

3,257,360
TERPOLYMERS AND PROCESSES FOR
MAKING SAME
Robert J. Slocombe, Dayton, Ohio, assignor to Monsanto
Company, a corporation of Delaware
No Drawing. Filed July 27, 1961, Ser. No. 127,123
10 Claims. (Cl. 260—78.5)

This invention is directed to improved terpolymer compositions possessing pendant hydroxyl groups which are functional in nature, i.e., capable of participating in further reactions. The expression "terpolymer" as used herein is a term of art frequently employed to describe polymer compositions formed by the reaction of three monomeric components. The present invention is concerned with terpolymers produced by reacting (a) vinyl chloride, (b) vinyloxyethanol (hereinafter referred to as VOE) and (c) a fumaric ester of the formula:

ROOC—CH=CH—COOR' wherein R is an alkyl substituent having 1 to 20 carbon atoms, and R' is selected from the group consisting of hydrogen, alkyl substituents having 1 to 20 carbon atoms, and monocyclic aralkyl substituents having 7 to 10 carbon atoms.

It is an object of this invention to provide functional primary hydroxyl-group-containing terpolymers having a reduced tendency towards autogenous cross-linking upon standing, heating, drying, etc., while at the same time having an increased primary hydroxyl content. A further object of this invention is the preparation of vinyl chloride/vinyloxyethanol/alkyl fumarate terpolymers having marked utility as surface coatings, and fire resistant imparting properties when reacted with organic polyisocyanates in the preparation of fire-resistant polyurethane polymers. The latter-mentioned polymers require fire resistant polyols which are not only functional in nature, but also have a sufficiently low molecular weight to allow expedient incorporation into the polyurethane system.

A further object of this invention is to provide functional terpolymers which contain primary hydroxyl groups and also are internally plasticized. By the expression "internally plasticized," it is meant that the plasticization is performed by one of the monomers which actually participates in the copolymerization reaction, as distinguished from externally applied plasticizers, viz., those which do not participate in the chemical reaction and are therefore subject to separation upon standing, aging, processing, etc.

A still further object of the present invention is to increase the amount of hydroxyl-containing monomer which can be successfully incorporated into the terpolymer, and increase the rate at which the hydroxyl-containing copolymerizable monomer is incorporated into the terpolymer system.

Hydroxyl-bearing copolymers of vinyl chloride have highly desired functional properties due to the presence of limited quantities of polar and reactive hydroxyl groups. The incorporation of hydroxyl groups into vinyl chloride polymers is utilized for alteration and improvement of certain properties of the vinyl chloride polymers, as for example: adhesiveness to surfaces, especially metal and glass; softening point; dyeability; compatibility with other plastics; capability for cross-linking (which can be selectively performed at the desired location and time); etc.

Vinyl chloride polymers and copolymers having good mechanical and chemical properties play a significant role in the plastics industry. Vinyl chloride polymers which possess the above-mentioned desirable properties and in addition contain quantities of functional hydroxyl groups are of particular interest since they offer increased flexibility in use over the normal vinyl chloride homopolymers and copolymers. One substantial drawback in the development of these hydroxyl-bearing vinyl chloride polymers has been the inability to arrive at an efficient relatively high conversion process for incorporating the functional hydroxyl groups into polymers. Moreover, some vinyl chloride polymers containing pendant hydroxyalkyl groups evidence instability and a tendency toward premature, internal cross-linking and are known to participate in polyacetal formation; that is, the pendant primary hydroxy group tends to condense with the functional vinyl group of an adjacent molecule of vinyloxyethanol monomer leading to an increase in length of the side chain without any increase in functionality.

The most widely accepted hydroxyl-containing vinyl chloride polymers known to the prior art are those prepared by polymerizing monomeric vinyl chloride in admixture with organic vinyl esters, such as vinyl acetate, to form a vinyl chloride-vinyl ester copolymer, and then subjecting this copolymer to a subsequent hydrolysis step whereby a portion of the ester groups are hydrolyzed to vinyl alcohol groups. The hydroxyl groups present on the vinyl chloride polymer according to this prior art are secondary hydroxyl groups. This polymer product has several disadvantages. One is the presence of relatively inaccessible secondary hydroxyl groups, which are not as desirable functionally as primary hydroxyl groups. Moreover, the secondary hydroxyl groups in the hydrolyzed vinyl chloride-vinyl acetate polymers of the prior art are packed more closely to the backbone chain, and are less apt to collide and chemically combine with other functional groups due to steric hindrance. The vinyloxyethanol containing terpolymers of this invention provide pendant primary hydroxyl groups which are readily accessible and relatively more distant from the polymer backbone chain so that these primary hydroxyl groups are readily accessible sterically. Another disadvantage is that frequently these secondary hydroxyl group-containing vinyl chloride polymers exhibit a yellow color and have decreased stability toward aging and oxidation. Finally, the secondary hydroxyl group-containing vinyl chloride polymers according to the prior art require an additional reaction step, i.e., the hydrolysis, which is above and beyond the copolymerization reaction. Moreover, the degree of hydrolysis is at best difficult to control, and consequently the product copolymer is high in cost.

I have found that, according to the present invention, vinyl chloride copolymers can be produced having the more desirable primary hydroxyl groups wherein these functional vinyl chloride copolymers are produced at acceptable conversions in a one-step reaction by copolymerizing monomeric vinyl chloride, monomeric vinyloxyethanol, and a monomeric fumarate ester. The use of alkyl fumarate ester monomers, e.g., dibutyl fumarate, is preferred. It appears that the alkyl fumarate ester monomer performs three essential functions with regard to the terpolymer composition. First of all, the alkyl fumarate ester monomer allows more vinyloxyethanol to participate in the interpolymerization, thus increasing the relative functionality of the terpolymer by causing an increase in the number of pendant hydroxyl groups per unit chain length of terpolymer. Secondly, the inclusion of the alkyl fumarate ester leads to the production of a more stable terpolymer, i.e., the product terpolymer is less apt to undergo the undesired internal cross-linking through side-chain polyacetal formations. Thirdly, the fumarate serves to internally plasticize the functional vinyl chloride terpolymer composition, thus allowing a more intimate association of plasticizer and polymer than can be achieved by the use of external plasticizers such as are commonly employed in the prior art. Of course, this internal plasticization imparts increased flexibility and desired mechanical properties to the terpolymer composition while at the same time substantially preventing separation (migration) of the plasticizer component.

FUMARATE ESTER MONOMER

The mono- and di-alkyl esters of fumaric acid are eminently suitable for employment as comonomers for vinyl chloride and vinyloxyethanol in accordance with the present invention. Those fumarate esters of the formula:

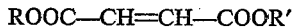

ROOC—CH=CH—COOR' wherein R is an alkyl substituent having 1–20 carbon atoms, and R' is selected from the group consisting of hydrogen, alkyl substituents having 1–20 carbon atoms and monocyclic aralkyl substituents having 7–10 carbon atoms can be used as fumarate monomers according to the instant invention. Examples of monomeric fumarates within the above formula include: dimethylfumarate; di-ethyl fumarate; di-butyl fumarate; di-hexyl fumarate; di-decyl fumarate; di-dodecyl fumarate; mono-decyl fumarate; mono-dodecyl fumarate; mono-stearyl fumarate; mono-butyl fumarate; mono-octyl fumarate; mono-hexyl fumarate; ethyl butyl fumarate; ethyl octyl fumarate; butyl hexyl fumarate; butyl octyl fumarate; butyl benzyl fumarate; etc. In the case of fumeric di-esters, the R and R' substituents in the preceding formula can be the same or different hydrocarbon groups. The use of alkyl substituents is preferred. When the alkyl groups are different, mixed di-alkyl fumarate esters are the result, and, of course, these mixed fumarate esters are quite suitable for use to prepare the improved terpolymers according to the present invention. The alkyl groups can have halogen, hydroxyl, etc. substituents and in general any fumarate esters, including mono- and di-esters, are suitable so long as they do not contain interfering substituents.

POLYMERIZATION CONDITIONS

The formation of vinyl chloride primary hydroxyl group-containing functional terpolymers within the purview of the present invention can be accomplished by the use of any one of several polymerization procedures. The copolymerization of vinyloxyethanol, vinyl chloride, and the fumarate can be carried out in bulk, solution, emulsion, and in aqueous or organic suspension. The initiation of the polymerization process occurs by the known method, for example, by oxygen, inorganic or organic peroxides, azo catalysts, or by redox catalysts. Azo catalysts perform especially well in the copolymerization procedures conducted in accordance with this invention. Azo catalysts such as those set forth in U.S. Patents 2,471,959, 2,515,628, 2,520,338, 2,520,339 and 2,565,573 can be employed. To illustrate, such diverse azo catalysts as azobisisobutyronitrile; methyl azobisisobutyrate, and di-ethyl-2,2'-azobis(2-methyl propionate) can be listed as exemplary. Any of these or similar azo catalysts can be employed, and the use of azo catalysts is preferred in preparing the functional terpolymers of this invention. Peroxy catalysts such as peroxides or percarbonates may also be employed, however. When peroxides are employed, the use of organic peroxide is preferred as typified by di-tertiary-butyl peroxide; benzoyl peroxide; lauroyl peroxide; tertiary-butyl perbenzoate; cumene hydroperoxide; etc.

One of the most common of said polymerization procedures is mass (bulk) polymerization where the only materials present in the reaction mixture are the reactive monomers themselves plus any catalysts and any modifier which may be used to effect the desired molecular weight. No added solvent or reaction medium is generally present. Suitable catalysts for the mass polymerization technique are those which promote generation of free radicals, e.g., peroxide and azo catalysts. By way of example are benzoyl peroxide; diacetyl peroxide; dimethyl phenylhydroperoxy methane; etc. Any of the azo catalysts set forth above can likewise be employed.

Another satisfactory polymerization technique is solvent polymerization which is similar to mass polymerization except that a solvent for the monomers which are to be subjected to copolymerization (interpolymerization) is also present during the polymerization reaction. Use of a solvent generally results in a lower molecular weight polymer.

The formation of these hydroxyl-containing functional copolymers can also be effected advantageously by suspension or emulsion polymerization techniques. Both suspension and emulsion polymerization involve the use of a non-solvent for the monomers concerned, but in the suspension technique the monomer particles (and ultimately those of the polymer) are comparatively large, while in the emulsion procedure the particles are much smaller and the final product is a latex. A suitable method for effecting the suspension polymerization is to employ water and a small amount of added suspending agent, such as a vinyl acetate maleic anhydride copolymer, or certain phosphates with a lauroyl peroxide catalyst and a limited amount of an emulsifier such as glycerol monostearate. A suitable emulsion polymerization procedure is to employ water alone with potassium persulfate catalyst, any suitable emulsifier, and a polymerization modifier. Emulsion and suspension polymerizations can be effected at temperatures which are chosen in accordance with the particular catalyst selected, but which may, for example, be from −100 to 200° C. and more preferably −50° to 100° C., although higher or lower temperatures can be employed, if desired.

The copolymerization procedures can be conducted over a wide temperature range depending in general upon the catalyst employed and the specific fumarate ester monomer chosen. The reaction can be allowed to proceed for a period of time from a few minutes to several hours or more, or even several days. Since vinyl chloride is a relatively unstable monomeric material, temperatures of about −15° C. to about 100° C. will generally be preferred for conducting the copolymerization reaction.

The pressures which are employed during copolymerization can vary from atmospheric pressure to higher pressures such as up to 100,000 p.s.i. The lower pressures will generally be employed, e.g., from atmospheric pressure to approximately 300 p.s.i. in the copolymerization procedures which are known in the art as "low pressure" polymerizations. In "high pressure" polymerizations pressures of about 300 p.s.i. to about 35,000 p.s.i. or even 100,000 p.s.i. or higher are usually employed, and it should be noted here that the desired properties and beneficial results in the terpolymer compositions according to the present invention are attainable both by low pressure and high pressure polymerization procedures. In general, in preparing the terpolymer compositions according to the present invention, it will be desirable to employ pressures ranging from atmospheric pressure up to about 35,000 p.s.i.

The primary hydroxyl group-bearing functional vinyl chloride/vinyloxyethanol/fumarate terpolymers can be prepared in a batch reaction, a series of batch reactions, or in a continuous reaction such as in a tubular reactor. Various catalysts can be used, such as for example those named above, at concentrations of about 0.05 to 5% (weight basis) based on the total monomer feed. The percent by weight in which the respective monomers are charged to the copolymerization reaction can vary widely. Suitable monomer concentrations for use in the present invention would be for example, 10 to 98 percent by weight of vinyl chloride, 2 to 90 percent by weight of the hydroxyl-containing monomer, vinyloxyethanol ($\beta$-hydroxyethylvinyl ether), and up to about 50 percent by weight of the fumarate ester monomer, e.g., di-butyl fumarate. Generally, it will be preferred to employ vinyl chloride in at least 50 percent by weight, and more preferably at least 70 percent by weight. Vinyloxyethanol will ordinarily be employed in amounts of about 5% to 30% or so by weight, and the fumarate ester monomer will generally be used in amounts of about 2 to 50% by weight based upon the total monomer feed, with the preferred range of fumarate being 2 to 20% by weight.

In preparing these vinyl chloride/vinyloxyethanol/fumarate terpolymer compositions, the copolymerization procedure may be complicated by loss of the vinyloxyethanol monomer during copolymerization. While the exact nature of this problem is not fully understood, it has become evident that under some polymerization conditions, especially the free radical initiated polymerizations when conducted at high temperature and pressure, vinyloxyethanol was cyclized to methyl dioxolane and efficiency of the copolymerization procedure was reduced in this manner. Although the employment of the fumarate ester monomer tends to reduce vinyloxyethanol loss by allowing the vinyloxyethanol monomer to enter into the copolymerization reaction at a faster rate of speed, it may also be advisable to employ certain side-reaction inhibitors during the interpolymerization reaction. Among those cyclization inhibitors which can be employed are those disclosed and claimed in copending application, Serial No. 127,122, filed on even date herewith and now Patent 3,159,610 issued December 1, 1964.

Although the present invention is directed primarily to vinyl chloride/vinyloxyethanol/fumarate terpolymers, small amounts of other comonomers can be employed. Of course, in order to attain the advantages of the present invention, it should be noted here that irregardless of what additional comonomers are employed to make tetrapolymers, pentapolymers, etc., the interpolymerized composition must contain the three essential monomeric ingredients, viz., vinyl chloride, vinyloxyethanol, and the fumarate ester. Additional comonomers, when employed, should not exceed 10% by weight of the total polymer composition. Of course, the larger the amount of additional comonomer, the less the compositions will resemble the vinyl chloride/vinyloxyethanol/fumarate terpolymer composition. In general, small amounts, e.g., 2-5% of additional comonomers which are monolefinically unsaturated and which demonstrate the capacity to copolymerize (interpolymerize) with the three essential monomeric ingredients can be employed to provide tailor-made polymers designed for a specific commercial utility.

The vinyl chloride/vinyloxyethanol/fumarate terpolymers of the present invention will generally speaking have intrinsic viscosities in cyclohexanone at 25° C. ranging from about 0.02 to 4.0 cps. This will correspond to number average molecular weights (Mn) varying from about 400 to about 250,000. The present invention is concerned with vinyl chloride/vinyloxyethanol/fumarate terpolymer compositions in both the low molecular weight and the high molecular weight range. The low molecular weight functional terpolymers can conveniently be cross-linked (cured) with an organic polyisocyanate, e.g., toluenediisocyanate, and used to prepare fire resistant polyurethane compositions, such as fire-resistant polyurethane foams (wherein water is employed as the foaming agent). The high molecular weight vinyl chloride/vinyloxyethanol/fumarate terpolymer compositions of the present invention possess utility as tenaciously adherent surface coatings, latex type paints, adhesives, molding compositions, melt coatings for metallic surfaces, e.g., wires, pipes, etc. Within the low molecular weight range the terpolymers will have intrinsic viscosities within the range of about 0.02 to 0.5 with corresponding number average molecular weights ranging from about 400 to about 1,000. The preferred intrinsic viscosities for the low molecular weight terpolymer compositions will range from 0.08 to 0.5, and the comparable preferred molecular weight range will vary from about 800 to about 1,000. The high molecular weight terpolymers will generally have intrinsic viscosities within the range of 0.5 to 4.0, with the related molecular weights ranging from about 1,000 to about 250,000. The preferred intrinsic viscosities of the high molecular weight terpolymer compositions will range from about 1.0 to about 2.0, with the corresponding preferred molecular weights ranging from about 5,000 to about 50,000.

Thermal stabilizers, fillers, dyes, pigments, other polymers, and other additives customarily employed to secure tailor-made properties can be employed in the vinyl chloride/vinyloxyethanol/fumarate terpolymers of the present invention. Those skilled in the art, having had the benefit of the present disclosure, will be able to choose by simple tests suitable proportions of a particular additive to give a terpolymer composition having characteristics desired for a particular commercial use.

The following examples provide details of certain preferred embodiments of the present invention. The data are to be taken as exemplary, and the invention in its broadest aspects is not limited to the particular conditions, proportions, and materials set forth therein.

*Example 1*

To stainless steel bombs were charged monomer mixtures of vinyl chloride, vinyloxyethanol, and dibutyl fumarate of the percentage constitution indicated below. Small amounts (0.07 to 2.0% by weight based on total monomer input) of side reaction inhibitors were included in the copolymerization mixtures along with about 0.15% by weight (of the total monomers charged) of a free radical-generating polymerization catalyst, azobisisobutyronitrile. The bombs were then sealed, placed in a water bath and heated to about 60° C. at autogeneous pressure. The copolymerization reaction was allowed to proceed under these conditions for the length of time indicated below. Then the autoclave was opened and the bombs were cooled to about room temperature and opened. The contents of the bombs were then transferred to a receptacle containing a solution of petroleum ether "Skellysolve-F." In place of the petroleum ether solution, a solution of methanol can be employed as precipitant. The vinyl chloride-vinyloxyethanol-dibutyl fumarate terpolymers precipitated immediately and were allowed to stand overnight. The residual petroleum ether solution was decanted off and passed through a filter.

The vinyl chloride-vinyloxyethanol-dibutyl fumarate terpolymers were collected and washed several times with fresh petroleum ether and then vacuum dried for 48 hours at 42° C. The monomer charge ratios, specific polymerization times, conversions, and weight composition of terpolymer are listed below in Table I.

TABLE I

VCl=vinyl chloride
VOE=vinyloxyethanol
DBF=dibutylfumarate

| Run No. | Monomer Ratio Charged [1] (wt. percent) | | | Reaction Time (hours) | Conversion to Polymer (percent) | Wt. percent of Product Terpolymer | | |
|---|---|---|---|---|---|---|---|---|
| | VCl | VOE | DBF | | | VCl | VOE | DBP |
| 1 | 89 | 10 | 1 | 2 | 27.0 | 77.7 | 4.71 | 17.6 |
| 2 | 89 | 10 | 1 | 1½ | 10.4 | 71.5 | 4.7 | 23.8 |
| 3 | 88 | 10 | 2 | 1½ | 12.6 | 69.5 | 5.5 | 25.0 |
| 4 | 86 | 10 | 4 | 1½ | 11.9 | 56.2 | 6.0 | 37.8 |
| 5 | 85 | 10 | 5 | 1½ | 12.7 | 50.7 | 6.2 | 43.1 |
| 6 | 86 | 12 | 2 | 1 | 7.2 | 62.5 | 6.6 | 30.9 |
| 7 | 85 | 12 | 3 | 1 | 7.9 | 53.1 | 6.9 | 40.0 |
| 8 | 84 | 12 | 4 | 1 | 8.4 | 47.1 | 8.0 | 44.9 |
| 9 | 93 | 6 | 1 | 1½ | 10.8 | 80.0 | 3.4 | 16.6 |

[1] Bomb charge: 0.0900 g. azobisisobutyronitrile (catalyst); 0.060 g. triethyl amine (cyclization inhibitor); 60.00 g. monomers.

Example 1 illustrates the preparation of VC1/VOE/DBF terpolymer compositions by a mass polymerization procedure conducted as a batch type operation.

Example 2

To glass reaction vessels were charged monomer mixtures of vinyl chloride, vinyloxyethanol (β-hydroxyethyl vinyl ether), and dibutyl fumarate of the percentage constitution indicated below. To each reactor, small amounts (1.0 to 3.0% by weight, both based upon total monomer input) of toluene as a solvent were added to the polymerization reactor. A boron triethyl (0.0253 mole)-cumene hydroperoxide (0.0069 mole)-pyridine (0.023 mole) initiating system was added to the polymerization vessels. The monomers were charged on a "mixed monomer feed" basis with the total amount of vinyl chloride monomer being charged with the initial monomer charge. The greater portion of the vinyloxyethanol (approximately 75%) was added initially, with the remaining 25% being added gradually over approximately a 20 minute period. The smaller amount of the dibutyl fumarate monomer was charged initially (approximately 12%), and the remaining amount was added subsequently during polymerization (approximately 88%). The polymerization procedure was carried out at a temperature of from 7-12° C. for the below indicated reaction periods. The conversions, monomer charge ratios, and compositional ratios of terpolymers are shown in Table II below. Example 2 illustrates a solution-type polymerization employing small amounts of toluene solvent. In the runs conducted according to Example 2, a low temperature, low pressure copolymerization catalyst system was employed. This boron combined catalyst system offers the advantages of polymerizations conducted at low pressure and employing low temperatures (temperatures in the range of about −25° to 40° C.). When operating at polymerization pressures close to atmospheric pressure or slightly below, gradual monomer addition can be carried out easily, thus facilitating the adjustment of the monomer ratios for a more homogeneous interpolymer. This homogeneity factor is important when preparing functional VC1/VOE/fumarate terpolymer compositions of low molecular weight, e.g., those which will be reacted with organic diisocyanates in the preparation of polyurethane compositions (especially polyurethane foamed compositions). In addition, both the vinyl chloride and vinyloxyethanol monomers tend to be more stable at lower temperatures. Also, the use of low polymerization temperatures, say below 25° C., has marked advantages with respect to polymer properties resulting from more crystalline polymer. With a boron compound-peroxide system, temperatures of 0 to 10° C. are especially suitable.

TABLE II

| Run No. | Monomer Ratio Charged [1] (wt. percent) | | | Reaction Time (hours) | Conversion to Polymer (percent) | Wt. percent of Product Terpolymer | | |
|---|---|---|---|---|---|---|---|---|
| | VCl | VOE | DBF | | | VCl | VOE | DBP |
| 1 | 86 | 12 | 2 | 5 | 39.9 | 67.0 | 7.6 | 25.4 |
| 2 | 86 | 12 | 2 | 4½ | 32.0 | 87.0 | 5.3 | 7.7 |
| 3 | 86 | 12 | 2 | 2½ | 31.9 | 61.9 | 8.5 | 29.6 |
| 4 | 86 | 12 | 2 | 2½ | 41.7 | 68.8 | 7.5 | 23.7 |
| 5 | 86 | 12 | 2 | 2½ | 32.0 | 87.0 | 5.3 | 7.7 |
| 6 | 86 | 12 | 2 | 2½ | 22.0 | 88.1 | 5.3 | 6.6 |

Initial monomer charge mixture for each run:

DBF, 2.0 g.
VCl, 86.0 g.
VOE, 12.0 g.
Toluene, 1.16 ml.

Subsequent monomer addition (gradually over a 20-minute period after allowing a ten-minute induction period):

G.
DBF 10.4
VOE 4.1

Catalyst system:

ml.
Dry Pyridine (0.023 mole) 1.85
Boron triethyl (0.0253 mole) 2.70
Cumene hydroperoxide (0.0069 mole) 1.43

Example 3

Vinyl chloride, vinyloxyethanol, and alkyl fumarate ester (Runs 2, 3, 5, 8 and 10) monomers in the below-indicated amounts were charged to polymerization vessels and copolymerized using boron triethylpyridine-cumene hydroperoxide in the below-indicated mole amounts. The polymerizations were carried out at the below-listed temperatures and times. "Runs" 1, 4, 6, 7 and 9 employed vinyl chloride and vinyloxyethanol only, whereas "Runs" 2, 3, 5, 8 and 10 used a fumarate ester monomer (either dibutyl fumarate or diethyl fumarate) in addition to the vinyl chloride and vinyloxyethanol. It will be observed that the three component system containing the fumarate allows the incorporation of vinyloxyethanol into the copolymer at a faster rate than is experienced with the two component (VCl-VOE) polymerizations. Also, a saving in the amount of VOE monomer (which is incorporated into copolymer compared to amount of VOE monomer charged) was effected by employment of a fumarate ester. The ability of the fumarate ester to get the VOE monomer to participate in copolymerization at a faster rate of speed is quite important as the faster the VOE monomer enters into the polymer, the shorter will be the period of time during which the VOE as a monomer will be subject to deleterious side reactions, polyacetal formations, internal cyclization, etc.

For example, "Run" 2 has just about the same percent efficiency as "Run" 1 but employed only about one-third the amount of BEt$_3$ catalyst. "Run" 10 employed less catalyst than "Runs" 6 and 7, yet the VOE in "Run" 10 copolymerized about twice as fast as in "Runs" 6 and 7.

The "percent efficiency in incorporating VOE in Polymer/hr." referred to in the table is essentially a conversion rate to VOE in polymer per hour, and is obtained by multiplying the grams of "MeOH Insoluble" by "percent VOE in polymer" to obtain the number of grams of VOE combined into polymer, then dividing this value by the "Wt. VOE charged" to arrive at the percent VOE combined in the polymer, and then dividing this by the "Time" for polymerization to obtain the "percent Efficiency . . ."

The terpolymer compositions prepared in the form of a concentrated solution using tetrahydrofuran as polymer solvent. The concentrated polymer solution (1.5 to 2.0 g. of solution) contained 1.0 g. of terpolymer. Each sample contained 1.0 g. of the VCl/VOE/DBF terpolymer compositions and 0.38 g. of toluene diisocyanate. These reactive mixtures were placed in glass reaction vessels. Then 0.04 g. of the first-mentioned catalyst solution and 0.03 g. of the second catalyst solution were added thereto. Then the reactive mixtures were stirred at room temperature and atmospheric pressure in the glass reaction vessels for approximately 1 to 5 minutes. After 1 minute had elapsed, it became visually apparent that reaction was taking place. The reaction was allowed to proceed to a reasonable degree of completion (10 to 20 minutes elapsed time was allowed). It was observed that the diisocyanate cured VCl/VOE/DBF terpolymer compositions foamed readily without requiring the application of external heat. The same procedure outlined above was performed using the same amounts of toluene diisocyanate and the same amounts of the first and second catalyst solutions, only employing a commonly used commercial triol, Union Carbide and Carbon Corpora-

TABLE III

| Run No. | Initiator (mole) | | | Temp. (°C.) | Time (hrs.) | Wt. VOE Charged (g.) | Wt. VCl Charged (g.) | Wt. Fumarate Charged (g.) | Wt. MeOH Insoluble (g.) | Percent VOE in Polymer | Wt. VOE in Polymer (g.) | Percent Efficiency in Incorporating VOE into polymer/hr. |
|---|---|---|---|---|---|---|---|---|---|---|---|---|
| | BEt$_3$ | Pyr. | CHP | | | | | | | | | |
| 1 | 0.016 | 0.016 | 0.016 | 10–15 | 6.40 | 50.0 | 50.0 (85.0) | 0.0 | 79.5 | 11.7 | 9.3 | 2.9 |
| 2 | 0.006 | 0.012 | 0.012 | 5–23 | 6.42 | 28.0 | 70.0 | [1] 2.0 (5.0) | 44.8 | 10.47 | 4.69 | 2.6 |
| 3 | 0.012 | 0.012 | 0.012 | 5–28 | 3.93 | 28.0 | 70.0 | [1] 2.0 (2.8) | 49.6 | 9.32 | 4.62 | 4.2 |
| 4 | 0.006 | 0.012 | 0.012 | 5–10 | 6.17 | 30.0 | 70.0 (40.0) | 0.0 | 54.3 | 5.7 | 3.1 | 1.7 |
| 5 | 0.012 | 0.012 | 0.012 | 3–7 | 2.12 | 29.0 | 70.0 (23.0) | [2] 1.0 (1.9) | 46.9 | 7.82 | 3.67 | 6.0 |
| 6 | 0.016 | 0.016 | 0.016 | 10–15 | 6.32 | 60.0 | 40.0 (85.0) | 0.0 | 67.7 | 15.9 | 10.76 | 2.8 |
| 7 | 0.016 | 0.016 | 0.016 | 20–25 | 6.80 | 70.0 | 30.0 (53.0) | 0.0 | 47.7 | 23.1 | 11.02 | 2.3 |
| 8 | 0.012 | 0.012 | 0.012 | −2 to −7 | 2.55 | 18.0 | 80.0 (135.0) | [1] 2.0 (1.9) | 55.2 | 3.11 | 1.72 | 3.7 |
| 9 | 0.006 | 0.012 | 0.012 | 5–10 | 6.42 | 40.0 | 60.0 (57.0) | 0.0 | 57.5 | 7.6 | 4.37 | 1.7 |
| 10 | 0.012 | 0.012 | 0.012 | 4–30 | 3.17 | 29.0 | 70.0 | [2] 1 | 48.9 | 9.48 | 4.64 | 5.1 |

[1] Dibutyl fumarate. [2] Diethyl fumarate. (#) amount shown in parenthesis added during run. BEt$_3$=boron triethyl. Pyr=pyridine. CHP=cumene hydroperoxide. MeOH=methanol.

*Example 4*

Vinyl chloride, vinyloxyethanol and dibutyl fumarate monomers in the parts by weight ratio of 86:12:2, respectively, were charged to a reaction vessel and copolymerized using the boron initiator catalyst system described above in conjunction with Example 2. The polymerization reaction was conducted at about 0° C. for approximately five hours. The VCl/VOE/DBF terpolymer composition analyzed as containing 77.5% by weight VCl, 6.4% by weight VOE, and 16.1% by weight DBF. The copolymerization reaction was conducted to a conversion of 8.0%. This boron initiated copolymerization illustrates the use of the boron combined catalyst system at slightly lower temperatures to produce the VCl/VOE/DBF terpolymer compositions of the present invention.

*Example 5*

In this procedure, polyurethane foams were prepared using the VCl/VOE/DBF terpolymer compositions of Runs 1–9, respectively, of Example 1 which were subjected to cross-linking (curing) by the use of an organic polyisocyanate cross-linking agent, toluene diisocyanate. Water was employed as the foaming agent. Two catalyst solutions were utilized. The first mentioned catalyst solution was prepared by mixing N-ethylmorpholine (0.5 g.), 1-methyl-4,4-dimethylaminoethylpiperazine (0.1 g.), silicone emulsifying agent (0.5 g.), and water (3.0 g.). The second catalyst solution was prepared by mixing stannous octanoate (1.0 g.) with tetrahydrofuran (9.0 g.).

tion's "LG–56," a low molecular weight triol formed from propylene oxide. The said commercial triol was also observed to foam readily without the application of heat under the same conditions employed in conjunction with the VCl/VOE/DBF terpolymer compositions of the present invention. It was observed that the said commercial triol gives a flexible foam structure, whereas the polyurethane foams produced from the VCl/VOE/DBF terpolymer compositions of Runs 1–9 of Example 1 led to the production of fairly rigid polyurethane foams. Each polyurethane foam sample, including the polyurethane foam produced using the "LG-56," was subjected to a burning test to determine its fire-resistant properties qualitatively.

A standard ⅜ inch Bunsen burner was adjusted with air ports open to produce a blue flame about 1 inch high. The tip of the flame was brought into contact with the end of the sample while the Bunsen burner was slightly inclined at an angle of roughtly 45° from the horizontal. The flame was held in contact with the end of the sample for approximately 30 seconds and was then removed. It was observed that in every instance the polyurethane foams produced by reacting toluene diisocyanate with the VCl/VOE/DBF terpolymer compositions of the present invention were self-extinguishing. By the expression "self-extinguishing," it is meant that the test specimens ceased to burn shortly after their removal from the Bunsen burner flame (5 to 15 seconds after removal from the burning flame). The polyurethane foam produced employing the said "LG-56" commercial triol continued to burn for quite some time after it had been removed from the flame. Charring of the "LG-56" sample was observed, thus indicating that it lacked fire-resistant properties. It was apparent that the polyurethane foam employing the said commercial triol had received substantial fire damage. The polyurethane foam compositions produced using the VCl/VOE/DBF compositions of the present invention (Runs 1–9 of Example 1) thus showed marked resistance to burning after removal from the gas flame. These polyurethane foams were also insoluble in hot cyclohexanone, thus demonstrating solvent resistance. Example 4 typifies the fire resistant properties which can be imparted to polyurethane foams by employing the functional terpolymer compositions of the present invention.

*Example 6*

The VCl/VOE/DBF terpolymer compositions of Runs 1 and 2 of Example 2 were divided into two equal portions, one being employed as a "control" for film casting evaluation, while the other portion was cured with an organic polyisocyanate (toluene diisocyanate). The terpolymer composition designated as produced by "Run 1" of Example 2 had a VCl/VOE/DBF compositional content in the finished polymeric product of 67:7.6:25.4, respectively, and the terpolymer composition of Run 2 of Example 2 had a VCl/VOE/DBF composition in the final polymeric product of 87:5.3:7.7, respectively. That portion of each terpolymer composition which was not to be subjected to curing was formed into a "control" casting solution by dissolving 1 weight part of terpolymer composition with 4 parts by weight of tetrahydrofuran solvent to give a weight concentration of polymer in tetrahydrofuran solution of 20%. A small amount of dibutyltin maleate (1% by weight of terpolymer) was added to the casting solution as a vinyl chloride stabilizer. The VCl/VOE/DBF casting solutions were cast onto highly polished stainless steel plates, and oven baked for 30 minutes at 150° C. The film properties of these uncured terpolymer compositions are summarized below in Table IV. Those portions of the VCl/VOE/DBF terpolymer compositions which were to be subjected to toluene diisocyanate curing were reacted with toluene diisocyanate as follows: 100 weight parts of the VCl/VOE/DBF terpolymer composition having a VOE content of 7.6% by weight (the terpolymer composition produced by Run 1 of Example 2) were dissolved in 400 parts by weight of tetrahydrofuran. Approximately 7.5 g. of toluene diisocyanate were added to the terpolymer solution. The reactant materials were stirred vigorously using a mechanical stirrer in an open glass reaction vessel. After approximately 1 minute, it was observed that a vigorous reaction was taking place. This reaction was allowed to proceed for about 20 minutes. Then the toluene diisocyanate cured VCl/VOE/DBF terpolymer compositions were subjected to solvent resistant tests, adhesion tests, etc. These terpolymer compositions were cast from tetrahydrofuran onto highly polished steel plates. These toluene diisocyanate cured VCl/VOE/DBF films were baked in an oven for 30 minutes at 150° C. Similar solutions were prepared with "Bakelite VAGH" in tetrahydrofuran. The test results are summarized below in Table IV.

Two qualitative adhesion tests were conducted. If the sample failed either test, it was rated as "poor." One test involved scoring the cast film with intersecting horizontal and vertical cutting lines spaced approximately $\frac{1}{32}$ in. apart, thus providing film squares approximately $\frac{1}{32}$ in. on an edge. This scoring was done after the sample films were baked on the steel plates. Then these squares were scratched with the fingernails starting from a position on a score line in an attempt to dislodge the films from the metal surface. The other adhesion test was the so-called "Scotch tape" test wherein a 2½ to 3 in. long by 1 in. wide strip of pressure sensitive adhesive tape ("Scotch tape," a product of the Minnesota Mining and Manufacturing Co.) was pressed down onto the baked films so that the tape was contiguous with the test films for a length of about two inches (area app. 2 in.²). About ½ to 1 inch of the tape was left free to serve as a tear strip. If the adhesion of the polymer film to the "Scotch tape" was greater than its adhesion to the substrate, then the sample was rated as "poor."

TABLE IV

| Property | VCl/VOE/DBF 67:7.6:25.4 (uncured control) | TDI Cured [1] VCl/VOE/DBF 67:7.6:25.4 | VCl/VOE/DBF 87:5.3:7.7 (uncured control) | TDI Cured [1] VCl/VOE/DBF 76:5.3:7.7 | Bakelite VAGH [2] VCl/VAlc/VA 91:6:3 | TDI Cured [1] Bakelite VAGH VCl/VAlc/VA 91:6:3 |
|---|---|---|---|---|---|---|
| Color | Water white | Slight yellow | Very slight yellow | Yellow | Water white | Yellow. |
| Adhesion | Good | Poor | Good | Poor | Good | Poor. |
| Bend Toughness | Crazes | Slight craze | Crazes | Slight craze | Slight craze | Slight craze. |
| Gel content (gel spots per in.²) | None | None | 6 | 6 | None | None. |
| Lifting in water at room temp. (24 hours) | No change | Slight lift softer | No change | No change | Slight lift softer | Slight lift softer. |
| Hot cyclohexanone resistance | Soluble | Insoluble | Soluble | Insoluble | Soluble | Insoluble. |
| Hot Cellosolve acetate resistance | Soluble | do | Insoluble | do | do | Insoluble. |

[1] Toluene diisocyanate reacted stoichiometrically 1:1.
[2] A vinyl chloride/vinyl alcohol/vinyl acetate—91:6:3 interpolymer obtained by partial hydrolysis of a vinyl chloride/vinyl acetate—85:15 copolymer.

The bend toughness test was performed by casting the film samples from tetrahydrofuran solution onto flexible (bendable) thin aluminum, steel, and copper metal plates. The test films were then baked for 30 minutes at 150° C. Then the metal plates with the films thereon were bent about a cylindrical mandrel having an outer circumference of about ¾ inch. The effect of bending was observed visually.

The test data in Table IV illustrate the use of the VCl/VOE/DBF terpolymer compositions of the present invention as coating compositions and demonstrate their capabilities in protecting metal and other surfaces from moisture and organic solvents. The polished metal plates are examples of smooth surfaced bases (substratas) which are difficult to coat because of the inherently low adhesion characteristics of the base material.

It will be observed that the toluene diisocyanate cured terpolymer compositions demonstrated decreased adhesion to the metal plates as compared with the uncured terpolymer compositions. This may have been caused by the elimination by the curing agent of free hydroxyls for metal bonding. In any case, a preliminary primer is normally used to give acceptable bonding of plastic films to metal surfaces. An example of such a primer coating which may be applied to metals before application of the terpolymer compositions would be "Bakelite WP (Specification MIL-C-15328A," which contains Bakelite's vinyl butyral resin XYHL (7.2 parts by weight); basic zinc chromate pigment (6.9 parts by weight); talc "Asbestine-3X" (1.1 parts by weight); lamp black (trace); isopropanol, 99%, or ethyl alcohol (48.7 parts by weight); phosphoric acid, 85% (3.6 p.b.w.); water (3.2 p.b.w.); and isopropanol, 99%, or ethyl alcohol (13.2 p.b.w.). The priming solution is made by diluting the phosphoric acid with water and isopropanol, and then mixing the acid diluent with the base grind to form the primer solution. The metal surface(s) should be thoroughly cleaned prior to application of the terpolymer compositions of the present invention whether or not an underlying primer coating is employed.

The vinyl chloride/vinyloxyethanol/fumarate terpolymer compositions of the present invention can be insolubilized to organic solvents by cross-linking with an organic polyisocyanate, and the polyisocyanate cross-linked terpolymer compositions are also included within the purview of the present invention. As examples of typical organic polyisocyanates which can be employed in accordance with the practice of the present invention, the following can be listed: m-phenylenediisocyanate; toluene diisocyanate; naphthalene-2,4-diisocyanate; cyclohexylene diisocyanate; benzene triisocyanate; P,P'-phenylenediisocyanate; diphenyl methane diisocyanate; butylene-1,4-diisocyanate; 2-methylbutane-1,4-diisocyanate; 3,3'-dimethyl-4,4'-biphenylene diisocyanate; 3,3'-dimethoxy-4,4'-biphenylene diisocyanate; etc. The molecular proportions of organic polyisocyanate to functional terpolymer can range from 1.2–1 to 5–1 (preferably 1.5–1 to 3–1).

*Example 7*

A cyclohexanone solution was made in a glass reaction vessel using 2 g. of a vinyl chloride/vinyloxyethanol/ diethyl fumarate terpolymer having an analyzed compositional constitution of 85.7:9.5:4.8, respectively. This terpolymer was prepared by reacting 70.0 parts of vinyl chloride, 29.0 parts of vinyloxyethanol and 1.0 part of diethyl fumarate using the boron catalyzed polymerization described above in connection with Example 2. This polymer was dissolved with 11 ml. of cyclohexanone solvent and divided into two equal halves. Then 0.09 g. of toluene diisocyanate was mixed with about one-half of the above polymer solution. The glass reaction vessel was inserted in an oil bath and heated for 20 minutes at 120° C. This gave approximately a 1:1 mol ratio of isocyanato and hydroxyl groups for reaction to form a pre-polymer. The remaining half of the said polymer solution was added to the half containing the isocyanate along with a small amount of triethylenediamine as catalyst. The reactant solution was then heated at 120° C. Within a few minutes after addition of the catalyst, the solution became cloudy, thus indicating the formation of the isocyanate cross-linked insolubilized polymer. A portion of the mixture which was not subjected to the last-mentioned heating was used to cast a film on a glass substrate. This film was dried at room temperature and heated in an air oven at 85° C. for 35 minutes. The glass substrate with the dried cured terpolymer film thereon was then removed from the oven, and subjected to treatment wtih tetrahydrofuran. Said film swelled slightly, but remained as a tight gel, thus demonstrating the characteristics of a highly cross-linked film.

A sample of the VCl/VOE/diethyl fumarate polymer solution not treated with toluene diisocyanate was used to make a similar film under the same conditions of heating. The tetrahydrofuran solvent readily dissolved the uncured film, thus demonstrating a lack of cross-linking without the isocyanate.

While the invention has been described herein, with particular reference to various preferred embodiments thereof, it will be appreciated that variations from the details given herein can be effected without departing from the invention in its broadest aspects. It is to be understood therefore that changes and variations can be made without departing from the spirit of the invention.

I claim:
1. The method of preparing a functional vinyl chloride terpolymer having reactable primary hydroxy groups which method comprises copolymerizing vinyl chloride, vinyloxyethanol and a monoolefinically unsaturated fumaric ester of the formula:

ROOC—CH=CH—COOR' wherein R is an alkyl group having 1–20 carbon atoms; and R' is selected from the group consisting of: hydrogen, an alkyl group having 1–20 carbon atoms, and a monocyclic aralkyl group having 7–10 carbon atoms, in the presence of a free radical polymerization catalyst, the vinyl chloride being used in an amount of 10 to 90 percent by weight, the vinyloxyethanol in an amount of 2 to 80 percent by weight, and the fumarate ester in an amount up to about 50 percent by weight, the amounts being based upon total monomer feed.

2. The method of claim 1 wherein polymerization is performed by reacting all of said monomers simultaneously.

3. The method of claim 1 wherein the copolymerization is performed by mixed monomer addition in which selected amounts of monomeric vinyloxyethanol and fumarate ester monomer are added gradually in controlled amounts as the copolymerization progresses with the proviso that at least a portion of the total amounts of said monomeric vinyloxyethanol and fumarate be present for reaction with the monomeric vinyl chloride at the onset of copolymerization.

4. The product of the process of claim 1.

5. The method of claim 1 in which the fumarate ester is dibutyl fumarate.

6. The method of claim 1 in which the fumarate ester is diethyl fumarate.

7. The method of claim 1 in which the fumarate ester is an alkyl fumarate.

8. The method of claim 7 in which the vinyl chloride is used in an amount of at least 70 percent by weight, the vinyloxyethanol in an amount of 5 to 30 percent by weight, and the fumarate ester in an amount of 2 to 20 percent by weight.

9. The method of claim 7 in which the terpolymer obtained has a molecular weight of about 400 to 1,000.

10. The method of claim 7 in which the terpolymer obtained has a molecular weight of about 5,000 to 50,000.

References Cited by the Examiner
UNITED STATES PATENTS

| | | | |
|---|---|---|---|
| 509,037 | 1/1955 | Carlin | 260—80.5 |
| 2,534,108 | 12/1950 | De Nie et al. | 260—78.5 |
| 2,563,459 | 8/1951 | Ellingboe et al. | 260—91.1 |
| 2,637,712 | 5/1953 | Upton | 260—78.5 |
| 2,780,567 | 2/1957 | Kine et al. | 260—91.1 |
| 2,828,220 | 3/1958 | McWhertee et al. | 260—78.5 |
| 2,950,262 | 8/1960 | Bush et al. | 260—2.5 |
| 2,956,031 | 10/1960 | Khawam | 260—2.5 |
| 3,017,396 | 1/1962 | Arond et al. | 260—78.5 |
| 3,027,358 | 3/1962 | Edbersbach et al. | 260—78.5 |

JOSEPH L. SCHOFER, *Primary Examiner.*

LEON J. BERCOVITZ, DONALD E. CZAJA,
*Examiners.*

L. WOLF, *Assistant Examiner.*